Sept. 18, 1928.
B. H. GREENE
1,685,052
AUTOMATIC ELECTRIC CONTROL SYSTEM
Filed Aug. 3, 1926
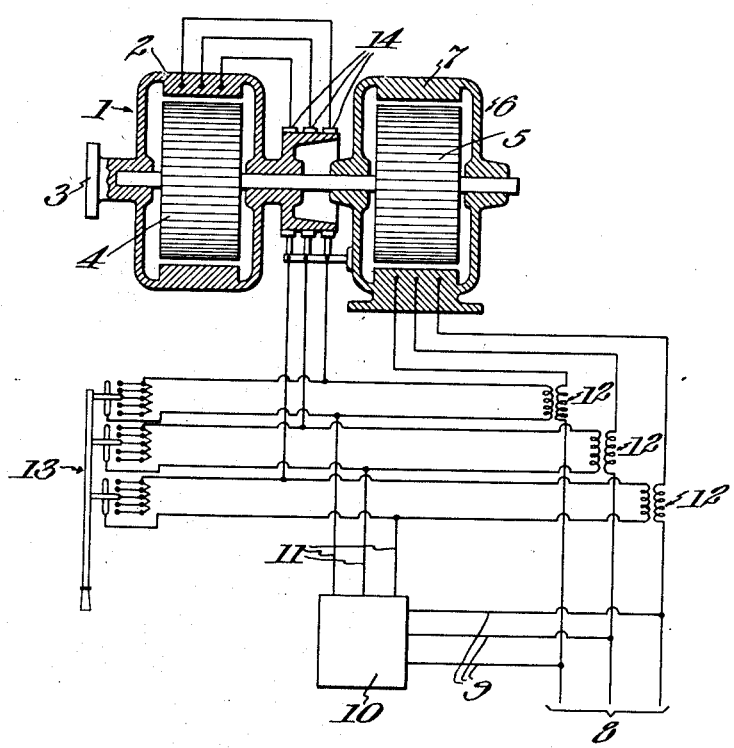
Inventor:
Benjamin H. Greene
By Byrnes Townsend Brickenstein
Attorneys.

Patented Sept. 18, 1928.

1,685,052

UNITED STATES PATENT OFFICE.

BENJAMIN H. GREENE, OF CANTON, OHIO.

AUTOMATIC ELECTRIC CONTROL SYSTEM.

Application filed August 3, 1926. Serial No. 126,882.

My invention relates to an electric control system for any mechanical equipment and particularly to a system for regulating the speed, torque or other properties of the mechanical equipment as the load or power varies.

In accordance with the invention a motor-generator is mechanically connected to a shaft of a machine, and the circuits of the motor and generator are so coupled that the output of the generator exerts a regulating effect on the motor. The character of the regulation depends upon the rate at which power is fed back from the generator as its speed varies.

An object of the invention is to provide an electrical system for automatically controlling or regulating the operation of mechanical equipment which is subject to varying loads or other operating conditions.

Another object is to provide a motor-generator for connection to the shaft of a machine, which motor and generator units have their circuits coupled in such manner that the output of the generator effects the desired regulation of the machine. More specifically an object is to provide an electrical control system effective to maintain a drag or braking action which is independent of the speed of a shaft to which the system is connected.

These and other objects will be apparent from the following description taken in connection with the drawings wherein the single figure is a diagrammatic showing.

Referring to the drawing, I have shown an induction motor 1, having a rotary field 2, connected by clutch or coupling 3 in any desired manner to the machine, roll train or other rotating mechanical equipment to be regulated. The rotor 4 of the motor has mounted on an extension of its shaft the rotor 5 of a generator 6, which in this case is shown as an induction generator but may be of any type.

The stationary field of the generator is designated 7.

Alternating current is fed to the three phase power lines 8, from which the field 7 of generator 6 is energized. Leading from main 8 are wires 9 to transformers 10, from the secondaries of which the field 2 of induction motor 1 is fed, by means of wires 11. In each phase and connected with each wire 11 are the secondaries of transformers 12, the primaries of which are in series with the wires leading from generator 6 to the line wires 8.

Shunted across the secondaries of these transformers are variable impedances 13 which may be resistive, reactive or composite impedances. Collector rings 14 deliver the current to the rotating field of induction motor 1.

The operation of my invention is as follows: Assuming clutch or coupling 3 to be connected to a machine, for example, the end roll of a roll train of a steel plate mill, the rotor 2 will revolve at a speed determined by the ratio of connections used at clutch or coupling 3. The connection at this clutch or coupling may be direct or by gearing, chain drive or other means. Then, with normal voltage and frequency supplied at the rings 14, the armature 4 will be rotated with respect to the field at less than synchronous speed, due merely to the magnetic rotary field. This action is analogous to that of an induction motor. With respect to a reference point outside of the system, however, the speed of the motor rotor 4 is materially above synchronous speed due to the fact that the primary 2 is mechanically rotated, in the same sense, by the clutch 3. The rotor 4 turns rotor 5 of generator 6 to thus generate power as an induction generator which power is fed back into the lines.

The particular design of transformers 10 and 12, and the variable resistors 13 depends upon the regulation which is to be effected in any particular installation. In roll-mill practice, the regulating system is designed to maintain a substantially constant drag or braking effect upon the rolls irrespective of their speed. To secure this result, the transformers 12 are so connected that current delivered therefrom to the motor field 2 is opposed to the current supplied through transformer 10. Assuming that the speed of the roll mill, and consequently the speed of the rotary field 2 increases, the primary effect is to increase the speed of the rotors 4 and 5, thereby increasing the current output of the generator 6. This increase in output results in an increased drag on the roll mill, but the increased output of the generator feeds back through transformers 12 to reduce the strength of the rotary field 2. The speed of rotors 4 and 5 decreases with the weakening of field 2 and thereby reduces the drag or braking action which the system exerts on the roll mill to just balance the increase due to higher speed.

Except for momentary variations, the system operates to maintain a substantially constant tension on the rotating system. The actual value of the tension may be varied by the adjustable resistors 13, and the closeness of the regulation is determined by the design of the transformers.

As the regulating effect is dependent upon the power fed back into the motor field, the design may be such that the rotating system to which the field is connected is held to a substantially constant speed.

It will also be noted that the electrical system is reversible and may be employed as a regulating drive for a rotary system instead of a regulating drag or brake for a driving system. For example, the clutch 3 may be connected to any suitable mechanism such as a wire reel for driving the same from the element 6, which then functions as a motor, through the element 1 which continues to function as a magnetic clutch. By a suitable design of the transformers 10, 12 and resistances 13, either a constant or varying torque may be secured at clutch 3 to maintain a constant or varying tension on the wire.

I do not wish to be limited to the details shown, except in so far as defined in the appended claims.

I claim:

1. In a system of regenerative braking and control, the combination with a source of alternating current, an induction motor having electric connections from said source to the primary thereof, means to rotate said primary by the machine to be controlled, an electric generator driven by the secondary of the induction motor, connections from said generator to said source whereby current is fed back to the source, and means for varying the current delivered to the primary of the motor inversely to the current delivered by the generator.

2. In a system of regenerative braking and control, the combination with a source of alternating current, an induction motor having electric connections from said source to the primary thereof, means to rotate said primary by the machine to be controlled, an electric generator driven by the secondary of the induction motor, connections from said generator to said source whereby current is fed back to the source, and series transformers in the generator leads, the secondaries whereof are connected to the motor leads, whereby the current delivered to the primary of the motor is opposed by a current proportional to the generator current.

3. The structure as in claim 2, wherein variable impedances are connected across the secondaries of the series transformers, to regulate the flow of current opposing the motor field current.

In testimony whereof, I affix my signature.

BENJAMIN H. GREENE.